United States Patent [19]

Mizuno

[11] Patent Number: 4,674,069

[45] Date of Patent: Jun. 16, 1987

[54] SYSTEM FOR COLLECTING AND PROCESSING DATA RELATING TO MOVING BODIES

[75] Inventor: Masao Mizuno, Kyoto, Japan

[73] Assignee: Omron Tateisi Electronics Co., Kyoto, Japan

[21] Appl. No.: 562,181

[22] Filed: Dec. 16, 1983

[30] Foreign Application Priority Data

| Dec. 16, 1982 | [JP] | Japan | 57-221512 |
| Dec. 16, 1982 | [JP] | Japan | 57-221513 |
| Dec. 16, 1982 | [JP] | Japan | 57-221514 |
| Dec. 16, 1982 | [JP] | Japan | 57-221515 |
| Dec. 16, 1982 | [JP] | Japan | 57-221516 |

[51] Int. Cl.⁴ .................................................. G01S 15/34
[52] U.S. Cl. ........................................ 367/90; 340/943; 367/97; 367/102
[58] Field of Search ............... 367/90, 97, 101, 102; 340/933, 936, 942, 943

[56] References Cited

U.S. PATENT DOCUMENTS

| 2,769,158 | 10/1956 | Schultz | 367/101 X |
| 3,016,513 | 1/1962 | Van Dyke | 367/102 |
| 3,290,490 | 12/1966 | Auer, Jr. | 340/943 |
| 3,343,167 | 9/1967 | Rademacher | 340/943 |
| 3,366,922 | 1/1968 | Kay | 367/102 |
| 4,279,019 | 7/1981 | Heyser | 367/102 X |
| 4,364,273 | 12/1982 | Redding | 367/101 |

Primary Examiner—Richard A. Farley
Attorney, Agent, or Firm—Lowe Price LeBlanc Becker & Shur

[57] ABSTRACT

An ultrasonic wave signal having its frequency varied continuously is transmitted from an ultrasonic wave transmitter toward a moving body. The wave reflected from the moving body is received by an ultrasonic wave receiver, and the resulting signal is frequency-demodulated to obtain a signal representing a frequency variation. A signal representing the feature of the moving body is produced with use of a signal representing the frequency variation of the transmitted ultrasonic wave and the signal representing the frequency variation of the received ultrasonic wave.

10 Claims, 21 Drawing Figures

FIG. 6
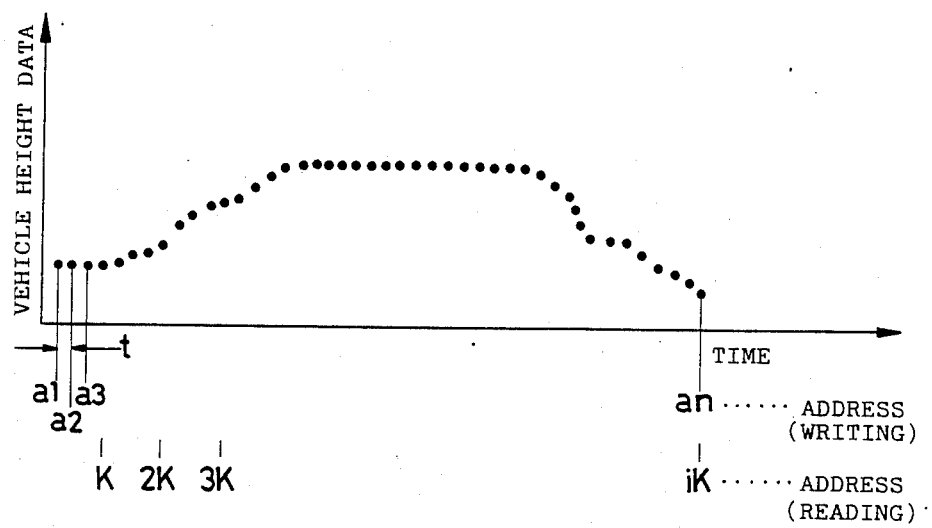
FIG. 7
| PASSENGER VEHICLE | COUNT |
| --- | --- |
| TRUCK | COUNT |
| BUS | COUNT |
FIG. 9
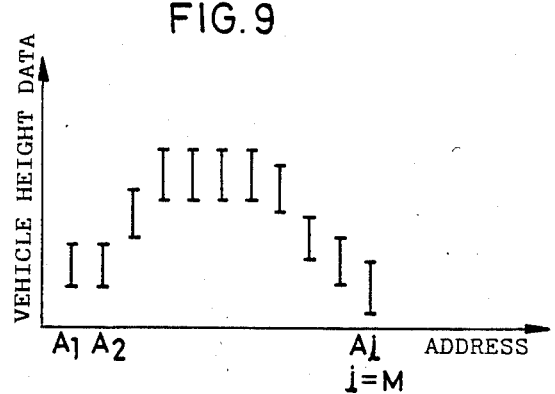

| USUAL PASSENGER VEHICLE | COUNT |
|---|---|
| SMALL PASSENGER VEHICLE | COUNT |
| LARGE TRUCK | COUNT |
| SMALL TRUCK | COUNT |
| LARGE BUS | COUNT |
| SMALL BUS | COUNT |

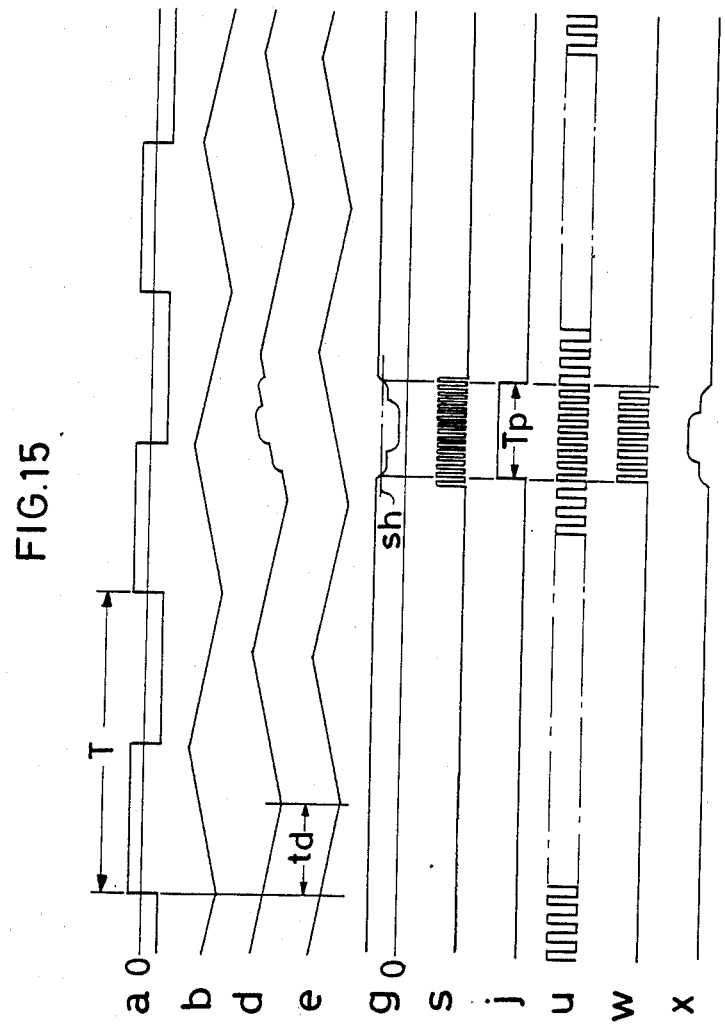

4,674,069

SYSTEM FOR COLLECTING AND PROCESSING DATA RELATING TO MOVING BODIES

BACKGROUND OF THE INVENTION

The present invention relates to a system for collecting data about a moving body with use of ultrasonic waves to produce signals representing the characteristics of the moving body, for example, to a system for collecting data relating to a traveling vehicle to detect the vehicle, prepare data as to the contour of the vehicle (measure the height of the vehicle) and distinguish the type of the vehicle based on the contour data.

Conventional systems for distinguishing various types of vehicles with use of ultrasonic waves include an ultrasonic wave transmitter disposed at a predetermined level above the road surface. Ultrasonic waves in the form of a pulse are intermittently transmitted from the transmitter with a specified period against the road surface, and the return waves are received upon reflection from the road surface or a vehicle. The time taken for the reciprocation of the ultrasonic waves is measured to detect presence or absence of the vehicle, measure the height of the vehicle or distinguish the type of vehicle based on the data as to the vehicle height. The ultrasonic waves are transmitted intermittently to avoid mixing of the transmitted waves and the reflected return waves. Thus, after the transmitted waves have been received upon reflection, the next waves must be transmitted. The period with which the waves are transmitted is therefore relatively long, which entails the problem that it is impossible to expect accurate detection of vehicles traveling at a high speed. For example, suppose the ultrasonic wave transmitter is installed at a level of 5 m from the road surface, and the sound velocity is 340 m/s. The time interval between the transmission and reception of the ultrasonic wave is then about 30 ms. Assuming that the velocity of the vehicle is 100 km/h and that the length of the vehicle is 4 to 5 m, it takes about 150 ms for the vehicle to pass the point of detection. Accordingly, even if the period of transmission of ultrasonic waves is 30 ms, the sampling points are limited only to a maximum of five for the vehicle traveling at 100 km/h. Since all the sampling data is not always effective, about three items of data will be actually effective. The height of the vehicle can then be measured only locally. With the vehicle data available thus limited to the items relating to the front or rear portion or the roof of the vehicle, there arises the problem that it is impossible to distinguish the type of vehicle accurately.

SUMMARY OF THE INVENTION

An object of the present invention is to provide a system for detecting the characteristics of moving bodies with high accuracy by collecting a large amount of accurate data relating to the moving body, especially to the contour thereof.

The system of the present invention is characterized in that the system comprises means for generating an ultrasonic wave signal having its frequency varied continuously, ultrasonic wave transmitting means adapted to be continuously driven by the signal, ultrasonic wave receiving means for receiving return ultrasonic waves including reflected waves from a moving body, means for frequency-demodulating an output signal from the ultrasonic wave receiving means and deriving a signal representing a frequency variation, and processing means for producing a signal representing a feature of the moving body with use of a signal representing the frequency variation of transmitted ultrasonic waves and the signal representing the frequency variation of the received ultrasonic waves.

According to the present invention, ultrasonic waves are continuously transmitted to collect data relating to a moving body, and the ultrasonic waves reflected form the moving body are continuously received. The frequency of ultrasonic waves is varied continuously, e.g., with a predetermined period, to make it possible to transmit and receive the waves continuously. Because accurate data as to the moving body can be obtained continously, the data is available in a large quantity to detect the moving body accurately.

The present invention can be embodied, for example, as a system for obtaining data as to traveling vehicles. Because not only vehicles are detectable but data can also be prepared as to the contour (height) of the vehicles, the types of vehicles can be distinguished from one another based on the contour data. When the present system is used in combination with a vehicle velocity sensor incorporating an optical system, data as to the length of vehicles is also available for more accurate distinction of vehicle types.

BRIEF DESCRIPTION OF THE DRAWINGS

FIGS. 1 to 9 show a system for distinguishing the types of vehicles embodying the present invention;

FIG. 1 shows an arrangement of ultrasonic wave transmitter and receiver;

FIG. 2 is a time chart showing frequency variations of transmitted waves and received waves;

FIG. 3 is a block diagram showing the electrical construction of the system;

FIG. 4 is a time chart showing output signals produced in the system shown;

FIGS. 5 (A) and (B) are diagrams showing exemplary vehicle height standard patterns;

FIG. 6 is a diagram showing a sampling data pattern;

FIG. 7 shows matching counters within a RAM;

FIG. 8 is a flow chart showing the process to be executed by an MPU;

FIG. 9 shows another example of a vehicle height standard pattern;

FIG. 10 is a block diagram showing an electric circuit for obtaining signals representing vehicle heights;

FIG. 11 is a time chart showing output signals produced in the circuit shown;

FIG. 12 is a block diagram showing an example of vehicle height arithmetic circuit;

FIGS. 13 to 19 show another embodiment of system for distinguishing the types of vehicles;

FIG. 13 shows an arrangement of ultrasonic wave transmitter and receiver and optical sensor;

FIG. 14 is a block diagram showing the electrical construction of the embodiment;

FIG. 15 is a time chart showing output signals produced in the circuit shown;

FIGS. 16 (A) and (B) show exemplary vehicle height standard patterns;

FIG. 17 shows a sampling data pattern;

FIG. 18 shows matching counters within a RAM; and

FIG. 19 is a flow chart showing the process to be executed by an MPU.

DESCRIPTION OF THE PREFERRED EMBODIMENTS

An embodiment will be described which is adapted to measure the flow of traffic, more particularly to detect vehicles, measure the heights of vehicles and distinguish the types of vehicles. While the term the height of a vehicle means the height of the highest portion of the vehicle, the term as herein used includes the height of a desired point at the upper end of the vehicle in longitudinal section.

Figure 1:
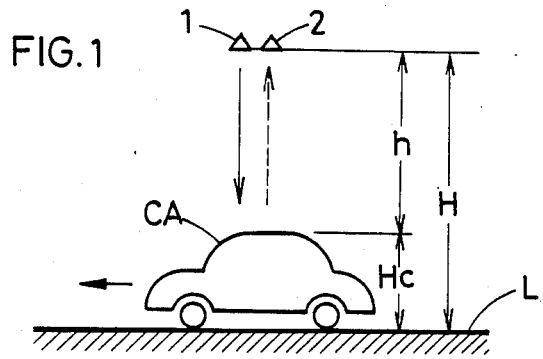

FIG. 1 shows an arrangement of ultrasonic wave transmitter 1 and receiver 2. The transmitter 1 and the receiver 2 are disposed at a predetermined level H above a road surface L and are fixed to a suitable support member. The transmitter 1 transmits ultrasonic waves against the road surface L, while the receiver 2 receives the ultrasonic waves returning upon reflection from the road surface L or a vehicle CA. The transmitter 1 and the receiver 2 may be separate devices or may constitute a single module. The frequency of the ultrasonic waves to be transmitted continuously varies with a specified period T as indicated in solid line in FIG. 2. With the present embodiment, the frequency variations are in the form of sawtooth (triangular) waves with respect to time but can be of any other desired wave form. The period T of variation of the frequency is preferably not less than the period of time, e.g., 30 ms, taken for the ultrasonic wave to travel from the transmitter 1 to the road surface L and then to the receiver 2. While the width between the upper limit and the lower limit of the ultrasonic wave frequencies is preferably large, presently available is an ultrasolic wave oscillator which generates (detects) ultrasonic waves of approximately constant amplitude (sensitivity) over a bandwidth of about 22 to about 30 KHz.

Figure 2:
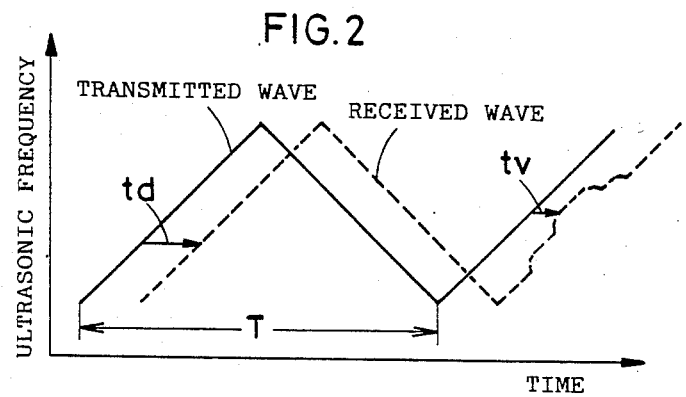

The wave form indicated in broken line in FIG. 2 represents the frequency variations of the ultrasonic waves received by the receiver 2. The waves reflected from the road surface L are received upon the lapse of time td after the transmission of the waves, while the waves reflected from the vehicle CA are received upon lapse of time tv (less than td). Suppose the velocity of sound is Vs, and the distance between the vehicle CA and the transmitter and the receiver 1, 2 is h. These time intervals are expressed by the following equations.

$$td = 2H/Vs \quad (1)$$

$$tv = 2h/Vs \quad (2)$$

It will be understood that the presence of the vehicle CA and the shape of the vehicle CA in longitudinal section can be detected by comparing the wave form of the transmitted waves and that of the received waves in FIG. 2.

The height of vehicle, Hc, which is the height of a point at the upper edge of the longitudinal sectional shape of the vehicle CA, is expressed by the following equation with use of $Hc = H - h$ and Equations (1) and (2).

$$\begin{aligned} Hc &= H - (tv \times Vs)/2 \\ &= (td - tv) \times Vs/2 \end{aligned} \quad (3)$$

Figure 3:
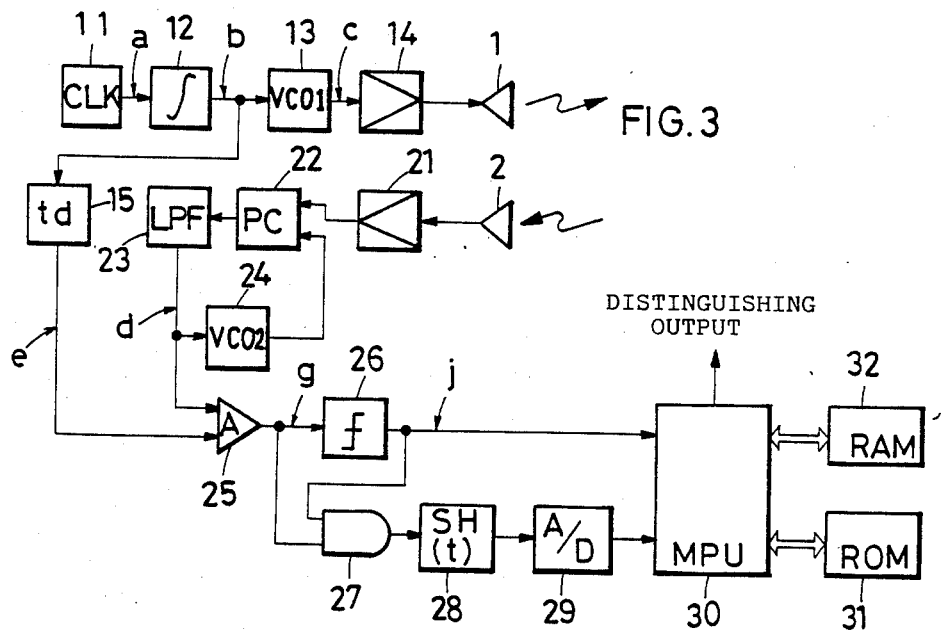
Figure 4:
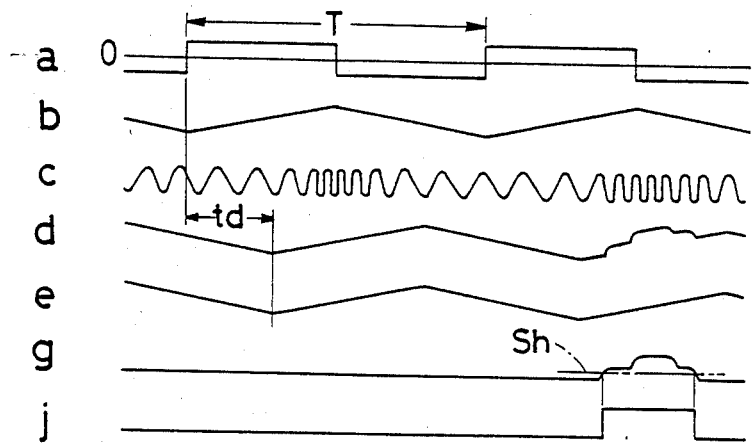

FIG. 3 shows the electrical construction of the vehicle type distinguishing system, and FIG. 4 shows the wave forms of the output signals from some blocks of the circuit.

A clock signal generating circuit 11 produces square wave signals a with the specified period T, and the signals a are converted to a sawtooth wave signal b in an integration circuit 12. The signal b is fed to a voltagecontrolled oscillator circuit 13, which has the function of voltage/frequency conversion for giving a signal of a frequency proportional to the input voltage. The output signal c of the oscillator circuit 13 is fed to a power amplifier circuit 14, which in turn drives the ultrasonic wave transmitter 1. In this way, ultrasonic waves having their frequency varied continuously with the specified period T, i.e., frequency-modulated waves, are transmitted from the transmitter 1 toward the load surface L.

The ultrasonic wave signals reflected from the road surface L or the vehicle CA and received by the receiver 2 are amplified by a voltage amplifier circuit 21 and then given to a phase comparison circuit 22. The circuit 22 compares the phase of the received wave signal with the phase of an output signal from a voltage-controlled oscillator circuit 24 and emits a voltage signal in accordance with the phase difference. The phase difference component is fed to a low-pass filter 23, by which the high-frequency component is removed from the input. The output d of the filter 23 controls the oscillation frequency of the circuit 24. The voltage-controlled oscillator circuit 24, the phase comparison circuit 22 and the low-pass filter 23 constitute a phase locked loop (PLL) which is used as a frequency demodulation circuit for the present embodiment. The voltage signal d thus obtained is in proportion to the frequency of received wave signal.

The output signal b of the integration circuit 12 is fed to a delay circuit 15 and is thereby delayed by the above-mentioned time interval td. The delayed signal e and the demodulated signal d are applied to a differential amplifier circuit 25. The differential signal g obtained from the circuit 25 represents the vehicle height Hc. Since the time delay td is the period of time taken for the reciprocation of the ultrasonic wave over the distance H between the road surface L and the transmitter 1 and the receiver 2, the two signals d and e are identical in phase and form when no vehicle is present, with the result that the differential signal g represents zero. However, when the vehicle CA is present, the wave form of the signal g is similar to the longitudinal sectional form of the vehicle CA. The signal g is discriminated at a suitable threshold level Sh by a comparison circuit 26, by which a detection signal j is obtained which indicates the presence of the vehicle. The vehicle detection signal j is fed to a microprocessor (MPU) 30.

The velocity of sound Vs varies with temperature, and the time interval td also varies accordingly. To avoid erroneous operation due to a change in the ambient temperature, it is desirable to effect temperature compensation for the time delay td provided by the delay circuit 15. However, the temperature compensation circuit need not always be provided when the threshold level Sh is determined with consideration given to the variation of the level of the signal g due to the temperature variation.

The signal g representing the vehicle height Hc is sent also to an AND gate 27. The gate circuit 27 has its gate opened by the vehicle detection signal j. Consequently the signal g is fed to a sample holding circuit 28 when a vehicle is detected. The circuit 28 samples the input signal g with a sampling period t and holds the result during the period. The sampled signal g is subjected to analog/digital (A/D) conversion by a circuit 29 and then fed to the MPU 30 for storage.

The MPU 30, which executes a process for distinguishing vehicles, is provided with a ROM 31 having stored therein an execution program therefor and vehicle height standard patterns for a plurality of types of vehicles, and a RAM 32 for storing various data.

Figure 5A:
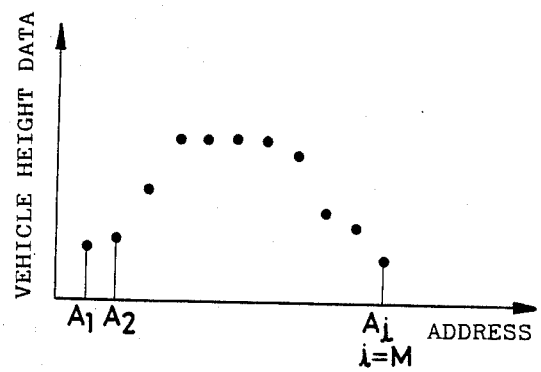
Figure 5B:
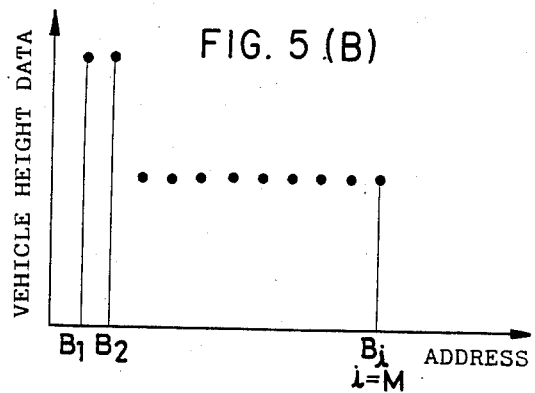

FIGS. 5 (A) and (B) show examples of vehicle height standard patterns stored in a pattern area in the ROM 31, (A) being a pattern for passenger vehicles, and (B) being a pattern for trucks. With the present embodiment, these standard patterns are normalized. Vehicles have different lengths, and the vehicle length varies greatly from type to type. However, the vehicle height standard patterns for all vehicle types are the same in the number of items of constituent vehicle height data, i.e., M in this number. These items of data are taken equidistantly for each type of vehicle. The addresses where the constituent items of data of the standard pattern for passenger vehicles are stored are designated at A1, A2, ..., Ai, and those for trucks are indicated at B1, B2, ..., Bi.

FIG. 6 shows the sampling data stored in the RAM 32 from the A/D conversion circuit 29. The data is stored in a data area of the RAM 32 in the order of sampling. The addresses of the storage locations where the items of data are stored are indicated at a1, a2, ... , an. As seen in FIG. 7, the RAM 32 further includes an area for use as matching counters for distinguishing or identifying types of vehicles. With the present embodiment, vehicles are classified into three types, i.e., passenger vehicles, trucks and buses. A matching counter is provided for each type of vehicle.

Figure 8:
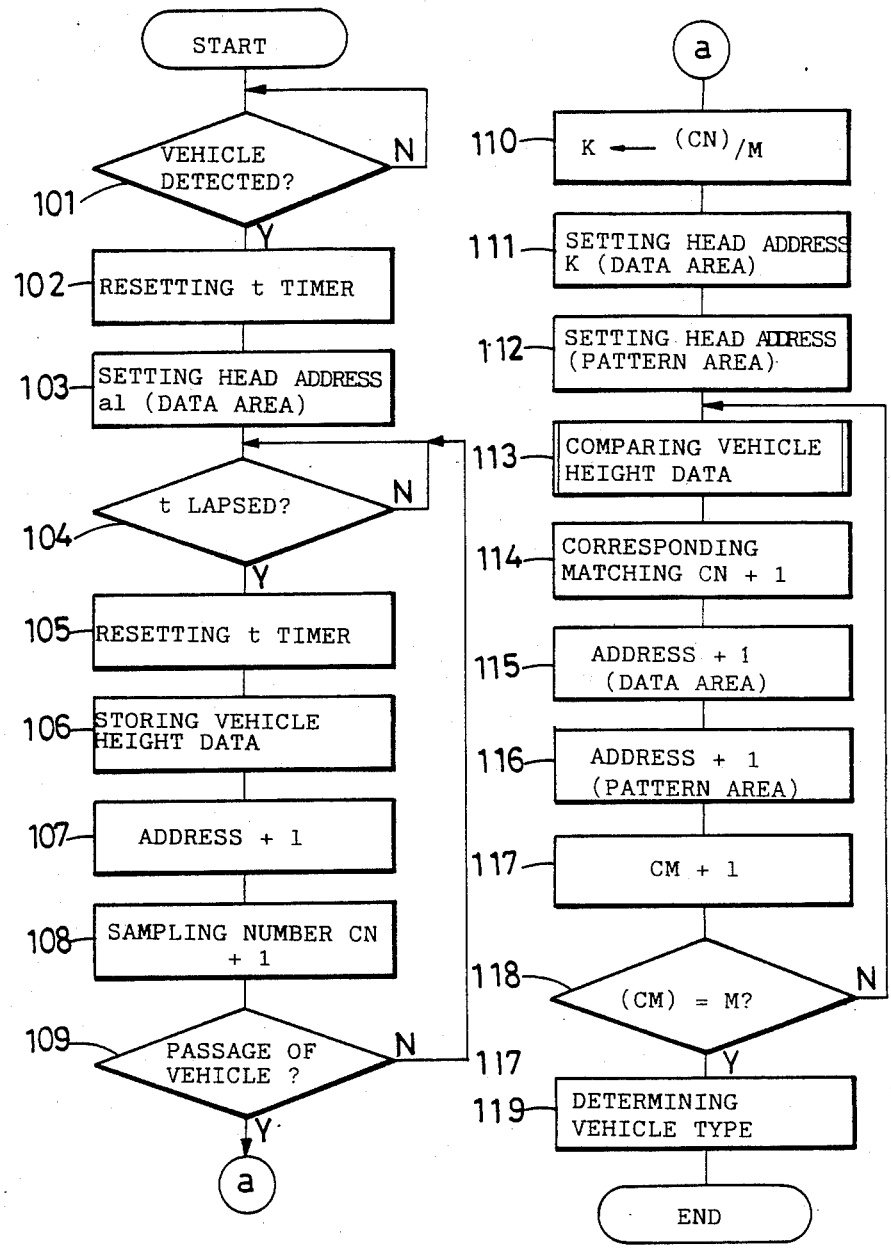

FIG. 8 shows the operation of the MPU 30. When the vehicle detection signal j is fed (step 101), a timer (not shown) provided for the MPU 30 for measuring the sampling period t is reset to start measuring the time (step 102). The head address a1 of the data area within the RAM 32 is set on an address counter (not shown, step 103). Upon the lapse of sampling period t (step 104), the timer is reset again (step 105), whereupon the timer starts measuring time. The vehicle height data is fetched from the A/D conversion circuit 29 and stored in the storage location addressed by the address counter (step 106). Next, 1 is added to the count on the address counter for storing another sampling data (step 107), and 1 is added to the count on a counter CN for counting the number of samples (step 108). The above steps 104 to 108 are repeated every time interval t to successively store the items of sampling data, with the number of samples counted by the counter CN. The vehicle detection signal j stops, indicating the passage of the vehicle (step 109), whereby the data collecting operation is completed. Operation to distinguish the vehicle type then follows.

For the comparison of the sampled vehicle height data with the vehicle height standard patterns, there is a need to match the number of sampling data items with the number M of data items of the standard pattern. The final count value n on the counter CN representing the number of sampling data items is divided by the data item number M to obtain the quotient K (step 110), which is used for assigning addresses for reading out the sampling data from the data area of the RAM 32. First, the head address K is set on an address counter (first counter) for the data area (step 111). A head address (e.g. A1) is set on an address counter (second counter, which is provided for each type of vehicle) for the pattern area of the ROM 31 (step 112). The item of sampling data and the data item of standard patten addressed by these counters are read out and compared (step 113). Such comparison is conducted between the sampling data and the data of the standard patterns for all types of vehicles. When the difference between the sampling data and the vehicle height data as to a particular type of vehicle is found to be the smallest of all such differences, 1 is added to the matching counter (FIG. 7) for that type of vehicle (step 114). To read out the next item of sampling data, K is added to the first counter (step 115), and to read out the next item of standard vehicle height data, 1 is added to the second counter (step 116). To count up the data item already compared, 1 is added to a counter CM (step 117). The steps 113 to 117 are continually executed until all items of the sampling data are completely compared with all vehicle height data items, M in number, of each standard pattern. Every time the sampling data item is compared, 1 is added to the matching counter for the particular type of vehicle whose standard vehicle height data is most approximate to the read-out sampling data. When the count on the counter CM has reached M (step 118), the counts on the matching counters are compared with one another. The vehicle checked is distinguished as a vehicle of the type the matching counter of which has the highest count value (step 119).

Although the sampling period t is measured also within the MPU 30 in FIG. 8, an interrupt signal may be fed from the A/D conversion circuit 29 to the MPU for every instance of sampling, such that the A/D converted sampling data will be fetched to the MPU 30 in response to the signal. Although the type of vehicle is identified based on the number of standard vehicle height data items which are most approximate to the sampling data items in the foregoing distinguishing process, some other known pattern distinguishing method is of course usable. As seen in FIG. 9, for example, a permissible range may be set for each item of the vehicle height data of the standard pattern to check whether the sampling data is within this range. In this case, the type of vehicle can be identified according to the number of sampling data items within the permissible range, or based on whether the number is greater than a predetermined number.

Figure 10:
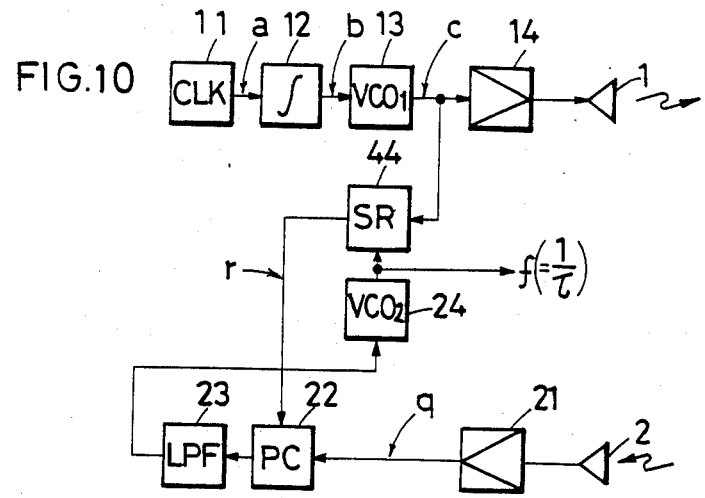
FIGS. 10 to 12 show a modification for measuring the height of vehicles.
Figure 11:
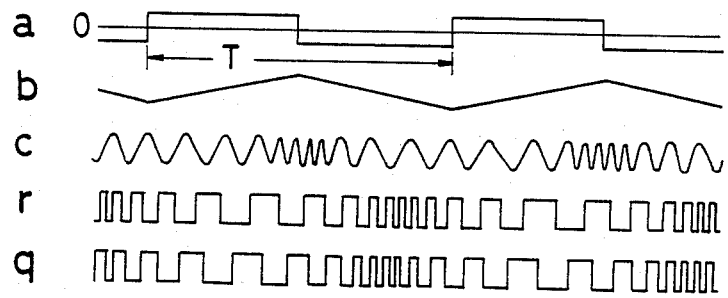
Figure 12:
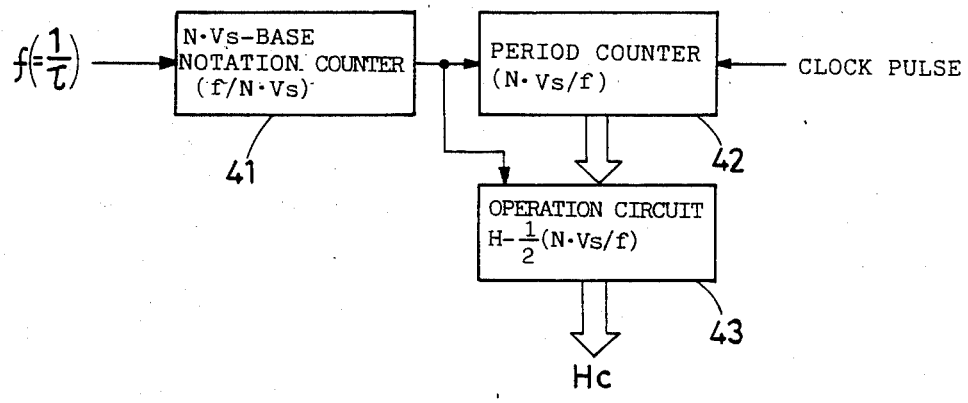

FIGS. 10 to 12 show a modification for measuring the vehicle height Hc. In FIGS. 10 and 3, like circuits and signals are referred to by like numerals or characters. The ultrasonic wave signal reflected from the road surface L or vehicle CA and received by a receiver 2 is amplified and converted to a pulse signal by a voltage amplifier circuit 21 and thereafter fed to a phase comparison circuit 22 as a signal q. On the other hand, the ultrasonic wave transmission signal c is fed also to a shift register 44. The input signal c is delayed by a period of time ts and converted to a pulse signal by the shift register 44. The register 44 comprises, for example, a charge coupled device (CCD). The output of a voltage-controlled oscillator circuit 24 is used as a clock signal for the shift register 44. Assuming that the period (clock period) of the output signal of the circuit 24 is $\tau$ and that the number of stages of the shift register is N, the time delay ts is given by $ts = \tau \times N$. The transmission signal r thus delayed is also fed to the phase comparison circuit 22.

The phase comparison circuit 22 compares the phase of the received wave signal q and the phase of the delayed transmission signal r and gives a voltage signal according to the phase difference. The phase difference component is fed to a low-pass filter 23 and has its high-frequency component removed. The output of the filter 23 controls the oscillation frequency of the voltage-controlled oscillator circuit 24. For example, when the frequency of the received wave signal q increases, the output of the phase comparison circuit 22 becomes positive to increase the oscillation frequency f of the circuit 24. With the increase of the frequency f, the clock period $\tau$ becomes shorter to decrease the time delay ts. The decreased time delay ts increases the frequency of the output signal r of the shift register 44 (in the case of rise of the modulated signal b), with the result that the signal r matches the received signal q in phase. In this way, the phase comaprison circuit 22, low-pass filter 23, voltage-controlled oscillator circuit 24 and shift register 44 act to match the phase of the output signal r of the shift register 44 with the phase of the received wave signal q.

It therefore follows that the time delay ts provided by the shift register 44 represents the time interval between the transmission of the ultrasonic wave and the reception of the reflected wave (the phase difference between the waves shown in FIG. 2, i.e., td or tv). Since the clock period $\tau$ and the time delay ts have the relationship of ts=$\tau \times$N, the frequency f (=1/$\tau$) of the output signal of the circuit represents the time delay ts. Assuming that the frequency f when a vehicle CA is detected is fv, the height of the vehicle, Hc, is given by the following equation with use of Equation (3).

$$Hc = H - (N \times Vs)/(fv \times 2) \quad (4)$$

FIG. 12 shows an exemplary circuit for calculating the vehicle height from Equation (4). The output pulse signal (frequency f) of the voltage-controlled oscillator circuit 24 is fed to an N$\times$Vs-base notation ring counter 41. This counter emits a count-up signal every time N$\times$Vs input pulses have been counted. Thus the counter 41 calculates f/(N$\times$Vs). Clock pulses of specified period are fed to a period counter 42, which is reset in response to every count-up signal from the counter 41 to start counting up the clock pulses from zero. The count on the counter 42 when the count-up signal is given represents (N$\times$Vs)/f and is forwarded to an operation circuit 43. Every time the circuit 43 receives the count-up signal from the counter 41, the counter 43 fetches the count on the counter 42, calculates the vehicle height from Equation (4) and produces a signal representing the vehicle height Hc.

The calculation of Equation (4) can of course be performed with use of a microprocessor.

With the embodiment shown in FIGS. 1 to 9, no consideration is given to the data as to the length of the vehicle in distinguishing the vehicle type. The type of a traveling vehicle can be identified with improved accuracy by measuring the length of the vehicle and using the result also as an item of data for the identification.

FIGS. 13 to 19 show an embodiment which is adapted to measure the velocity of a vehicle, calculate the length of the vehicle from the velocity measurement and the time taken for the passage of the vehicle and distinguish the type of the vehicle with high accuracy with use of the data as to the length of the vehicle.

Figures 13, 18:
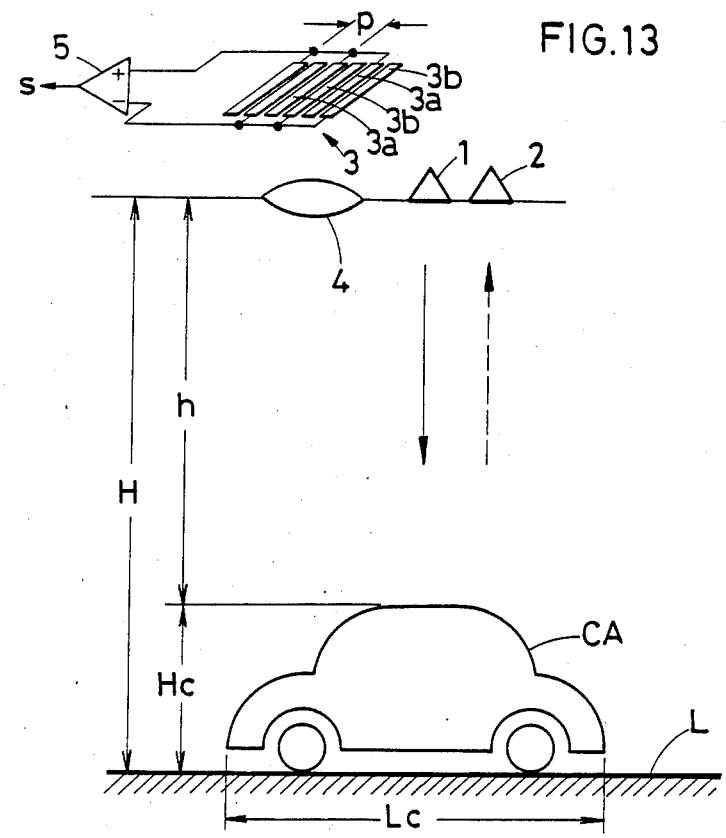

FIG. 13 shows, in addition to ultrasonic wave transmitter and receiver 1, 2, an optical sensor disposed at a level of H above the road surface L. The optical sensor has incoroporated therein an optical system including a lens 4 for detecting a vehicle CA within a field of view, a sensor array 3 disposed on the image forming plane of the lens 4 and constituting a space filter, and a differntial amplifier circuit 5. The vehicle sensing zone of the optical sensor is provided at the same location as the vehicle sensing zone of the ultrasonic sensor comprising the transmitter 1 and the receiver 2. The sensor array 3 comprises a multiplicity of slender photoelectric conversion elements 3a and 3b alternately arranged in a row in parallel and interconnected respectively as illustrated in FIG. 13. Thus the array 3 delivers two outputs, which are fed to the differential amplifier circuit 5. The circuit 5 in turn produces a signal s corresponding to the difference between the two output signals.

When the vehicle CA passes through the field of view of the optical system, the light emanating therefrom (e.g. from the headlight) or reflected therefrom is sensed by the sensor array 3, whereupon the differential amplifier circuit 5 delivers an output signal s of a frequency fo in accordance with the height of the vehicle detecting point and the velocity V of the vehicle. The relationship between the output signal s and the vehicle velocity V and the distance h between the sensor and the vehicle is given by the following equation. D $$fo = K_1 V/ph \quad (5)$$

wherein $K_1$ is a proportionality constant, and p is the pitch of the space filter, i.e., the spacing between the photoelectric conversion elements 3a or 3b.

It will be readily understood that when Equation (5) is divided by Equation (2), the component relating to the distance h is eliminated, with the result that the frequency of the signal s is converted to a function of the vehicle velocity V only.

If the time taken for the vehicle to pass the detecting location, i.e., time Tp during which the vehicle is detected (see FIG. 15, signal j) is obtained, the length LC of the vehicle CA can be calculated from the following equation with use of the velocity measurement V.

$$Lc = Tp \times V \quad (6)$$

Figure 14:
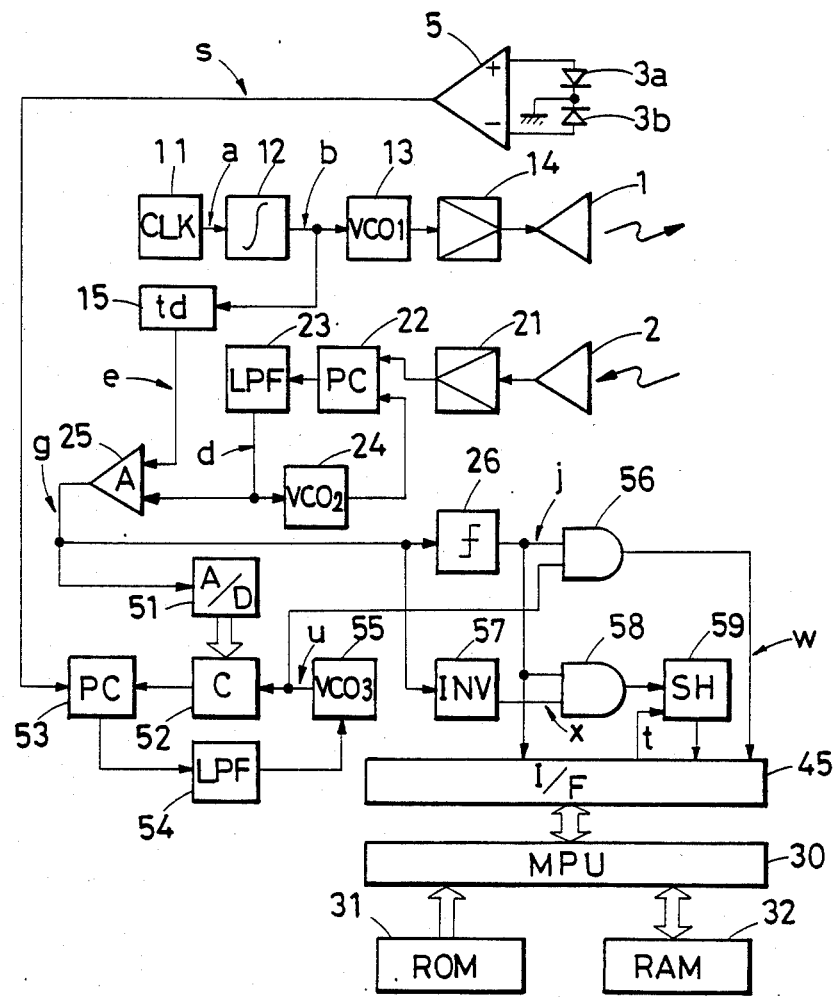

FIG. 14 shows the electric circuit of the present system, and FIG. 15 shows the wave forms of output signals produced from blocks of the circuit. Throughout FIGS. 3, 4, 14 and 15, like components and signals are referred to by like numerals and symbols.

With the present embodiment, a differential amplifier circuit 25 is adapted to produce a signal of the highest level when the difference between input signals d and e is zero. When the difference is not zero, the circuit 25 produces a signal of a level lower than the highest level by the difference. Accordingly when the vehicle CA is present, the wave form of the signal g is recessed toward the negative side and is similar to the longitudinal sectional form of the vehicle CA. The signal g is discriminated at a suitable threshold level Sh by a comparison circuit 26, whereby a detection signal j is obained which indicates the presence of the vehicle. The detection signal j is used for controlling the gates of AND gates 56, 58 and is also fed to an MPU 30 through an interface 45.

The output signal g of the differential amplifier circuit 25 is fed also to an inversion circuit 57, which produces an inverted signal x. The signal x is similar to the longitudinal shape of the vehicle and represents the height of vehicle Hc. (The signal has the same shape as the signal g shown in FIG. 4.) The signal representing the vehicle height Hc is applied to the AND gate 58. Since the gate circuit 58 has its gate opened by the vehicle detection signal j, the signal x is fed to a sample holding circuit 59 when the vehicle is detected. The circuit 59 samples the input signal x with a sampling period t and retains the data until the subsequent instance of sampling. As will be stated later, the sampling period t is determined by the MPU 30 based on the velocity V of the vehicle and is given to the holding circuit 59 every time a vehicle is detected. The sampled signal is subjected to analog/digital (A/D) conversion by the interface 45 and is fetched by the MPU 30 as vehicle height data.

The output signal g of the differential amplifier circuit 25 is sent also to an A/D conversion circuit 51 and thereby converted to a digital signal, which serves as a setting input for a programmable counter 52. The counter 52 divides the frequency of an input signal thereto (i.e. an output signal from a voltage-controlled oscillator circuit 55) by Na which is the setting input. Suppose the frequency of the input signal is fa. The frequency of the output signal from the counter 52 is then fa/Na. Since the setting input Na is given by the output of the A/D conversion circuit 51 which output is proportional to the distance h from the sensor to the vehicle (or the distance H from the sensor to the road surface), Na can be expressed by $$Na = K_2 h \quad (7)$$

wherein $K_2$ is a proportionality constant.

On the other hand, the output s from the differential amplifier circuit 5 of the optical sensor is applied to a phase comparison circuit 53, which compares the signal s and the output signal of the counter 52 with respect to the phase, giving a voltage output according to the phase difference. The phase difference voltage has its high-frequency component removed by a low-pass filter 54 and then fed to the voltage-controlled oscillator circuit 55 to control the oscillation frequency fa thereof. The circuit 55 is controlled by the programmable counter 52, phase comparison circuit 53 and low-pass filter 54 which form a closed loop so that the oscillation frequency fa will match Nafo, i.e., fa=Nafo.

Substituting Equations (5) and (7) in Equation fa=Nafo, the frequency fa is expressed by $$fa = K_3 V \quad (8)$$

wherein $K_3$ is another proportionality constant.

This indicates that the frequency fa of the output signal u of the circuit 55 is a value proportional only to the vehicle velocity V. This signal u is obtained as a velocity signal w when the AND gate 56 has its gate opened by the vehicle detection signal j. In the interface 45, the velocity signal w is converted to data directly representing the vehicle velocity V, by a known processing circuit, e.g., a counter which counts up the pulse number (frequency) of the signal w. The data is fed to the MPU.

Figure 16A:
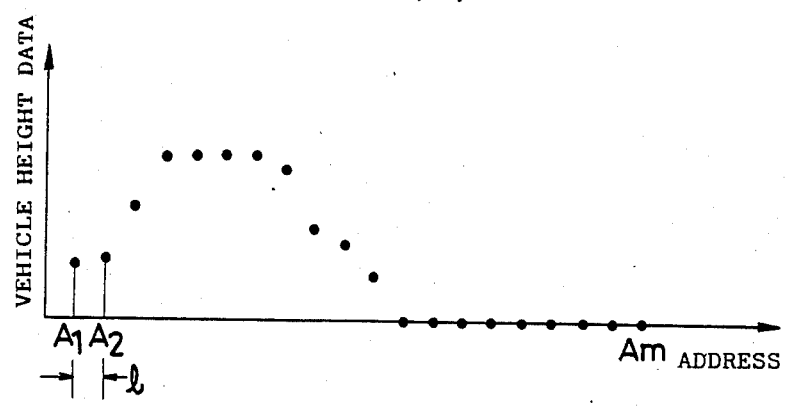
Figure 16B:
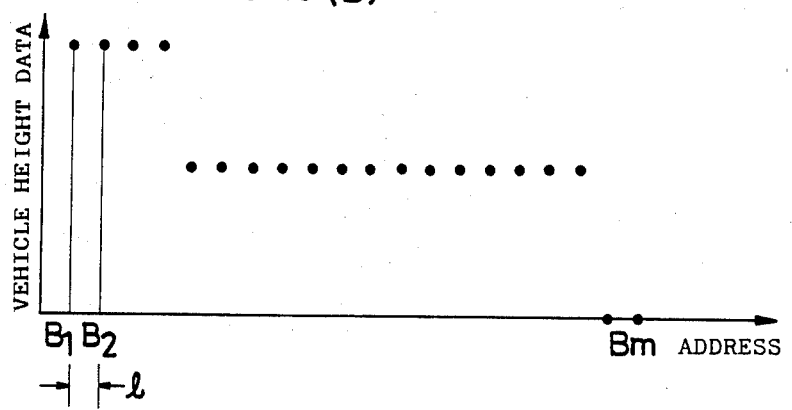

FIGS. 16 (A) and (B) show examples of vehicle height standard patterns stored in a pattern area of a ROM 31. Unlike those shown in FIGS. 15 (A) and (B), these patterns are not normalized. FIG. 16 (A) shows a pattern for usual passenger vehicles, and FIG. 16 (B) a pattern for large trucks. The vehicle height data items of these standard patterns are taken at a specified spacing l for all types of vehicles. Accordingly the number of data items increases with the increase of the length of vehicle. The spacing l is obtained by dividing the maximum value Lc max (e.g. 10 m) of the lengths of all vehicles by a predetermined number M, which represents the number of vehicle height data items as to the type of vehicle having the maximum length Lc max. The addresses where the constituent items of data of the vehicle height standard pattern for usual passenger vehicles are stored are designated at A1, A2, ..., Am, and those for large trucks are indicated at B1, B2, ..., Bm.

Figure 17:
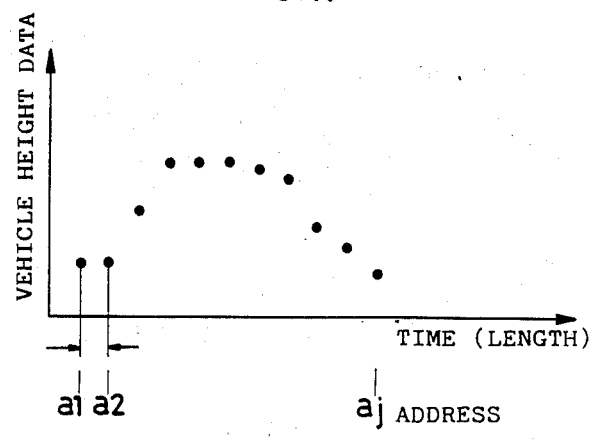

FIG. 17 shows the sampling data stored in a RAM 32. The data is stored in a data area of the RAM 32 in the order of sampling. The addresses of the storage locations where the items of data are stored are indicated at a1, a2, ..., aj. The sampling period t is given by $$t = l/V \quad (9)$$

wherein l is the above-mentioned spacing, and V is the vehicle velocity measured. The time t is the time taken for the vehicle to travel a distance l. The data area has a capacity to store up to M items of data.

With the present embodiment, the vehicle length Lc is also a factor for distinguishing passenger vehicles, trucks and buses from one another, so that the size, large or small, can also be distinguished for these vehicles. Accordingly the RAM 32 is internally provided with six matching counters for usual passenger vehicle, small passenger vehicle, large truck, small truck, large bus and small bus as shown in FIG. 18.

Figure 19:
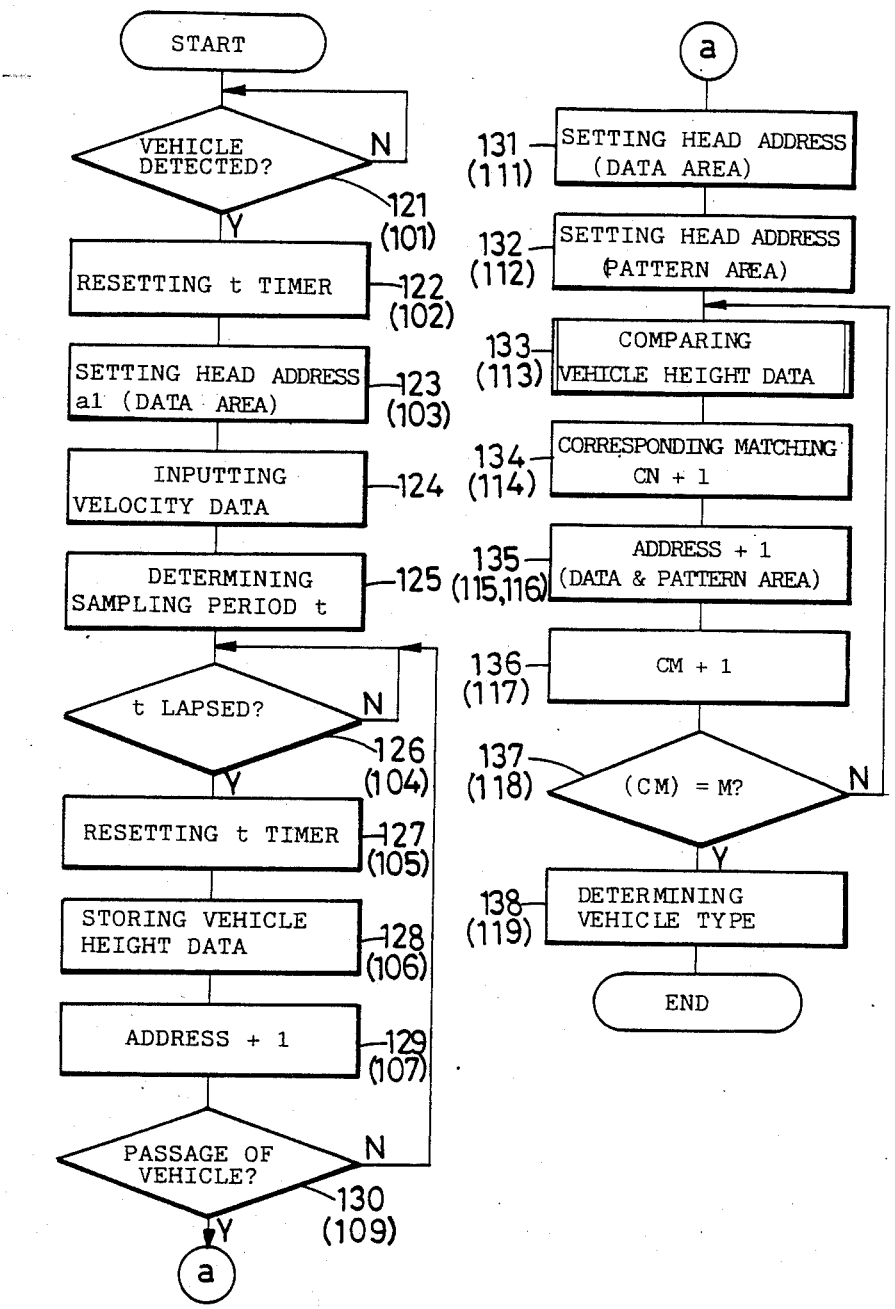

FIG. 19 shows the operation of the MPU 30. In FIG. 19, the same steps as those shown in FIG. 8 individually in corresponding relation are referred to by the step reference numbers of FIG. 8 as written in parentheses, in addition to new step numbers. After a vehicle is detected in step 121, the velocity data is stored (step 124), and the sampling period t is determined with use of the velocity V and Equation (9) (step 125). The period t is then given to the sample holding circuit 59. Further the data area within the RAM 32 is cleared, and vehicle height data collecting operation is repeated at the time interval of every sampling period t (steps 126 to 129). The number of samples need not be counted (see FIG. 8, step 108).

Upon the passage of the vehicle, the MPU operates for distinguishing the vehicle type (steps 131 to 138). These steps are almost the same as steps 111 to 119 shown in FIG. 8 except that although FIG. 8 shows step 110 for normalizing the vehicle height data, all vehicle height data is compared with the vehicle height standard patterns in FIG. 19. A counter CM is used for counting the number of data items already compared.

What is claimed is:

1. A system for collecting and processing data relating to a traveling vehicle comprising:
   means for generating an ultrasonic wave signal having its frequency varied continuously and a signal representing the frequency variation of the ultrasonic wave signal, ultrasonic wave transmitting means disposed above a road surface and adapted to be continuously driven by the ultrasonic wave signal, ultrasonic wave receiving means disposed above the road surface for receiving return ultrasonic waves including reflected waves from the road surface and the vehicle, means for frequency-demodulating an output signal from the ultrasonic wave receiving means and deriving a signal representing a frequency variation of the received ultrasonic wave, means for delaying the signal representing the frequency variation of the ultrasonic wave signal generated by the generating means by a predetermined time interval, and means for producing a signal representing the difference between the delayed signal and the signal representing the frequency variation of the received ultrasonic wave to obtain a signal representing the contour of the vehicle.

2. A system for measuring the height of a vehicle as defined in claim 1 wherein the predetermined delay time is the period of time taken for reciprocation of the ultrasonic wave over the distance between the road surface and the ultrasonic wave transmitting and receiving means, and wherein the signal representing the contour represents the height of the vehicle.

3. A system for collecting and processing data relating to a moving body comprising:

means for gnerating an ultrasonic wave signal having its frequency varied continuously and a signal representing the frequency variation of the ultrasonic wave signal, ultrasonic wave transmitting means adapted to be continuously driven by the ultrasonic wave signal, ultrasonic wave receiving means for receiving return ultrasonic waves including reflected waves from the moving body, means for frequency-demodulating an output signal from the ultrasonic wave receiving means and deriving a signal representing a frequency variation of the received ultrasonic wave, means for delaying the signal representing the frequency variation of the ultrasonic wave signal generated by the generating means by a predetermined time interval, means for producing a signal representing the difference between the delayed signal and the signal representing the frequency variation of the received ultrasonic wave to obtain a signal representing the contour of the moving body, and means for producing a signal representing presence or absence of the moving body by discriminating the signal representing the contour of the moving body at a predetermined threshold level.

4. A system for distinguishing the type of a vehicle comprising:

means for generating an ultrasonic wave signal having its frequency varied continuously, ultrasonic wave transmitting means disposed above a road surface and adapted to be continuously driven by the ultrasonic signal, ultrasonic wave receiving means disposed above the road surface for receiving reflected waves from the road surface and the vehicle, means for frequency-demodulating an output signal from the ultrasonic wave receiving means and deriving a signal representing a frequency variation, and processing means comprising means for producing a signal representing the height of the vehicle by comparing the signal representing the frequency variation of transmitted waves with the signal representing the frequency variation of the received ultrasonic waves, and means for identifying the type of the vehicle by comparing sampling data of the signal representing the height of the vehicle with preset vehicle height patterns as to a plurality of types of vehicles.

5. A system for distinguishing the type of a vehicle comprising:

means for generating an ultrasonic wave signal having its frequency varied continuously, ultrasonic wave transmitting means disposed above a road surface and adapted to be continuously driven by the ultrasonic wave signal, ultrasonic wave receiving means disposed above the road surface for receiving reflected waves from the road surface and the vehicle, means for frequency-demodulating an output signal from the ultrasonic wave receiving means and deriving a signal representing a frequency variation, means for detecting the velocity of the vehicle, and processing means comprising means for producing a signal representing the height of the vehicle by comparing a signal representing the frequency variation of transmitted waves with the signal representing the frequency variation of the received ultrasonic waves, means for sampling the signal representing the vehicle height with a sampling period determined by the vehicle velocity detected, and means for identifying the type of the vehicle by comparing sampled vehicle height data with preset vehicle height patterns as to a plurality of types of vehicles.

6. A system for detecting the velocity of a moving body comprising:

means for generating an ultrasonic wave signal having its frequency varied continuously, ultrasonic wave transmitting means adapted to be continuously driven by the signal, ultrasonic wave receiving means for receiving the reflected ultrasonic waves from the moving body, means for extracting a specific frequency component due to the movement of the moving body through an optical system including a space filter and converting the component to a first electric signal representing the velocity of the moving body and the distance from the optical system to the moving body, means for frequency-demodulating an output signal of the ultrasonic wave receiving means and deriving a signal representing a frequency variation, means for producing a second signal representing the distance to the moving body by comparing the signal representing the frequency variation of transmitted ultrasonic waves with the signal representing the frequency variation of the received ultrasonic waves, and means for eliminating the factor representing the distance to the moving body from the first signal with use of the second signal.

7. A method of detecting a traveling vehicle comprising:

generating an ultrasonic wave signal having its frequency varied continuously and transmitting the signal toward a road surface from above the road surface, receiving at a location above the road surface return ultrasonic waves including the waves reflected from the road surface and the vehicle and developing a received ultrasonic signal, delaying a signal representing said transmitted ultrasonic wave signals, and producing a signal representing a feature of the vehicle by comparing the delayed signal with the received ultrasonic signal.

8. A system for collecting and processing data relating to a traveling vehicle comprising:

means for generating an ultrasonic wave signal having its frequency varied continuously, ultrasonic wave tranmitting means disposed above a road surface and adapted to be continuously driven by the signal, ultrasonic wave receiving means disposed above the road surface for receiving return ultrasonic waves including reflected waves from the road surface and the vehicle, means for delaying the signal representing ultrasonic wave signal to be transmitted, means for comparing the delayed signal with the received ultrasonic wave signal to detect the phase difference therebetween, and means for controlling the delay time of the delaying means based on the phase difference detected.

9. A system for collecting and processing data relating to a traveling vehicle as defined in claim 8 further comprising:

the ultrasonic wave transmitting means disposed above a road surface, the ultrasonic wave receiving means disposed above the road surface for receiving the reflected waves from the road surface and the vehicle, and means for calculating the height of the vehicle based on a control signal of the controlling means.

10. A system for collecting and processing data relating to a moving body, comprising:

means for generating an ultrasonic wave signal having its frequency varied continuously, ultrasonic wave transmitting means adapted to be continuously driven by the ultrasonic wave signal, ultrasonic wave receiving means receiving return ultrasonic waves including reflected waves from the moving body, means for frequency-demodulating an output signal from the ultrasonic wave receiving means and deriving a signal representing a frequency variation of the received ultrasonic wave, processing means for producing a first signal representing a feature of the moving body, means for storing features of a plurality of different types of moving bodies, and means for correlating the first signal with stored features to identify the type of moving body detected.

* * * * *